(12) United States Patent
Sugiyama et al.

(10) Patent No.: US 6,599,420 B2
(45) Date of Patent: Jul. 29, 2003

(54) FILTER BAG

(75) Inventors: Nobuyuki Sugiyama, Tokyo (JP);
Kazuo Shiraiwa, Tokyo (JP)

(73) Assignee: iBio Limited, Tokyo (JP)

( * ) Notice: Subject to any disclaimer, the term of this patent is extended or adjusted under 35 U.S.C. 154(b) by 208 days.

(21) Appl. No.: 09/734,013

(22) Filed: Dec. 12, 2000

(65) Prior Publication Data

US 2001/0052492 A1 Dec. 20, 2001

(30) Foreign Application Priority Data

Jun. 19, 2000 (JP) .......................... 2000-183365
Jul. 3, 2000 (JP) .......................... 2000-201205

(51) Int. Cl.$^7$ .......................... B01D 35/00; C12M 3/06
(52) U.S. Cl. .................. 210/233; 210/238; 210/484; 383/38; 383/40; 383/41; 383/107
(58) Field of Search .................. 210/233, 238, 210/251, 483, 484; 383/38, 40, 41, 107, 120

(56) References Cited

U.S. PATENT DOCUMENTS 4,892,832 A    1/1990   Omote et al.

FOREIGN PATENT DOCUMENTS

| FR | 2719785 | 11/1995 |
|----|---------|---------|
| GB | 2267046 | 11/1993 |
| JP | 60-14400 | 2/1982 |
| JP | 4-33759 | 3/1985 |
| JP | 4-37440 | 3/1985 |
| JP | 6-4718 | 6/1988 |
| JP | 6-5760 | 6/1988 |
| JP | 07303471 | 11/1995 |

*Primary Examiner*—Robert Popovics
(74) *Attorney, Agent, or Firm*—Rothwell, Figg, Ernst & Manbeck

(57) ABSTRACT

A filter bag (1) comprises a first thin plastic film (22); a second thin plastic film (21) having substantially the same size with the first plastic film and sealed to the first plastic film at a first side-peripheral edge (2a), a second side-peripheral edge (2b) opposite to the first side-peripheral edge and a bottom peripheral edge (2d) thereof to provide an open-top interior, and a filter sheet (5) having a length substantially equal to the first and second plastic films and a width smaller than the first and second plastic films. The filter sheet has a first longitudinal edge (5a) interposed and sealed together between the first side-peripheral edges of the first and second plastic films and a second longitudinal edge (5b), opposite to the first longitudinal edge, sealed to the inside of the first plastic film at an intermediate position in width of the filter bag. The filter sheet is also sealed to the inside of the second plastic film, in vicinity to the first longitudinal edge, to provide a half-length seam (5c) extending from the open top edge halfway toward the bottom of the filter bag. A sample receiving section (3) of a larger volume is defined between the first and second plastic films and the filter sheet whereas a suspension collection section (4) of a smaller volume is defined between the first plastic film and the filter sheet. The first plastic film preferably includes a pull-tab (7) near the open top edge, between the second longitudinal edge and the half-length seam. The pull-tab is manually pulled down over a given length to provide a pipette-inserting window.

4 Claims, 2 Drawing Sheets

FILTER BAG

BACKGROUND OF THE INVENTION

1. Field of the Invention

The present invention relates to a filter bag typically for use in homogenization of food samples.

2. Description of the Prior Art

Any food sample must be subjected to microorganism inspection with an electronic microscope. Before subjected to the inspection, a filter bag containing the food sample and suitable dilution is set to a predetermined position in a homogenizer. The homogenizer has, for example, a pair of reciprocating rollers or paddles, which are driven by a drive mechanism connected to a motor to repeatedly press one side of the filter bag. Another type of the homogenizer is disclosed in Japanese patent No. 2,816,669 issued to Matsuo, which is incorporated herein for reference. Homogenization may also be carried out without using a homogenizer. In handwork homogenization, the bag containing the food sample and dilution is pressed by a hand roller or squeezed by hand. During mechanical or handwork homogenization over a sufficient period of time, the food sample contained in the filter bag is mechanically smashed and homogenized to prepare a suspension. Then, a small quantity of the suspension is pipetted to a laboratory dish which is placed on a slide glass of the electronic microscope for microorganism inspection.

A typical example of the filter bag is disclosed in Japanese utility-model publication No. 6-23280 which comprises a pair of rectangular thin plastic films sealed to each other at three edges thereof to provide an open-top interior, which is divided into two sections by a filter. The filter has substantially the same size with the opposite two plastic films and is interposed therebetween at the sealed three edges, so that the divided two interior sections has the same volume. The food sample with dilution is poured into one section which is referred to as a sample receiving section. While the food sample is smashed during homogenization, it tends to pass through the filter to enter the other section which is referred to as a suspension collection section. When the food sample is sufficiently smashed to be passed through the filter, it enters the suspension collection section. The suspended food obtained in this section may be pipetted with a Piet inserted through the open-top of the filter bag. Any particles which can not pass through the filter remain in the sample receiving section as a residue.

In this prior art filter bag, the filter is interposed integrally between the opposite two plastic films, which makes it difficult to enlarge the open-top of the filter not only when pouring the food sample and the dilution into the sample receiving section but also pipetting a small quantity of the suspended food in the suspension collection section.

The size of the filter bag depends on a type of the homogenizer but has usually 30 cm or more in length (height). Pipettes have various length. When the liquid level of the suspension collected in the suspension collection section is relatively low, which is to be pipetted with a pipette smaller than the filter bag, it may be possible that the tip end of the pipette does not reach the liquid level of the suspension. In this case, the operator is required to squeeze the bottom of the suspension collection section from opposite sides or tilt the filter bag so that the liquid level is elevated sufficiently to allow the pipette to become accessible. This is off course troublesome operation. Further, excessive squeezing or slanting operation would cause overflow of the suspension from the open-top of the filter bag, thereby soiling the operators hands and clothes.

SUMMARY OF THE INVENTION

Accordingly, it is a principal object of the present invention to overcome the drawbacks and disadvantages of the prior art filter bag.

Another object of the present invention is to provide a filter bag having an easily enlargeable open top to facilitate entry of a food sample in a sample receiving section as well as pipetting of a suspension from a suspension collection section.

In accordance with an aspect of the present invention, therefore, there is provided a filter bag comprising a first thin plastic film; a second thin plastic film having substantially the same size with the first plastic film and sealed to the first plastic film at a first side-peripheral edge, a second side-peripheral edge opposite to the first side-peripheral edge and a bottom peripheral edge thereof to provide an open-top interior, and a filter sheet having a length substantially equal to the first and second plastic films and a width smaller than the first and second plastic films. The filter sheet has a first longitudinal edge interposed and sealed together between the first side-peripheral edges of the first and second plastic films and a second longitudinal edge, opposite to the first longitudinal edge, sealed to the inside of the first plastic film at an intermediate position in width of the filter bag. The filter sheet is also sealed to the inside of the second plastic film, in vicinity to the first longitudinal edge, to provide a half-length seam extending from the open top edge halfway toward the bottom of the filter bag. A sample receiving section of a larger volume is defined between the first and second plastic films and the filter sheet whereas a suspension collection section of a smaller volume is defined between the first plastic film and the filter sheet.

In a preferred embodiment, the first plastic film includes a pull-tab near the open top edge, between the second longitudinal edge and the half-length seam. The pull-tab is manually pulled down over a given length to provide a pipette-inserting window. The pull-tab may have substantially semicircular arc or crescent.

The first plastic film may have one or plural indexes below the pull-tab at predetermined level from the bottom in relation to a quantity of the food sample to be received in the sample receiving section The indexes serves guide lines in pull-down of said pull-tab.

BRIEF DESCRIPTION OF THE DRAWINGS

Other objects and advantages of the present invention can be understood from the following description when read in conjunction with the accompanying drawings in which.

DETAILED DESCRIPTION OF THE PREFERRED EMBODIMENT

Figure 1:
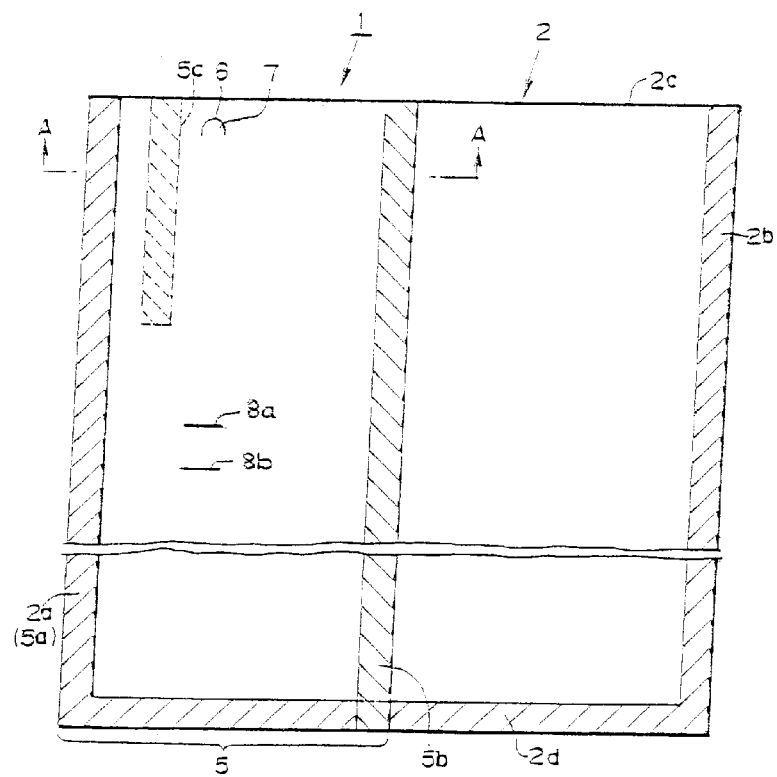
FIG. 1 is a front view of a filter bag embodying the present invention.
Figure 2:
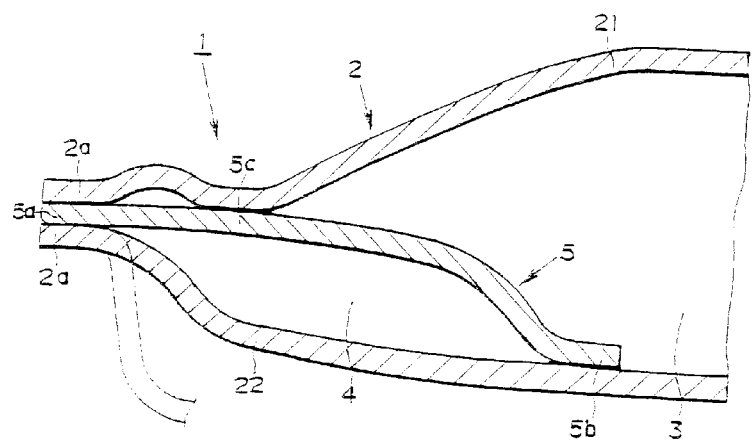
FIG. 2 is a cross-section taken along the lines A—A in FIG. 1.
Figure 3A:
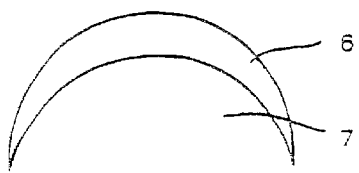
FIGS. 3(A) to 3(F) show variations in shape of the pull-tab near the open top edge of the filter bag
Figure 3B:
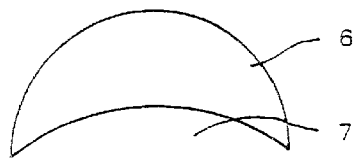
Figure 3C:
Figure 3D:
Figure 3E:
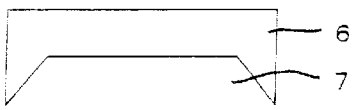
Figure 3F:

A filter bag according to a preferred embodiment of the present invention will be described in detail in reference to FIG. 1 showing the front view of the bag and FIG. 2 showing the cross-sectional construction at the upper portion of the bag.

The filter bag 1 comprises a pair of thin, rectangular plastic films 21 and 22 and a filter sheet 5. In this embodiment, the plastic films 21 and 22 are made of fiber-reinforced polyethylene and have the same size of 190 mm×300 mm, which are sealed to each other at their opposite two side-peripheral edges and bottom edges to provide a bag 2 with an open top 2c. Reference numerals 2a and 2b designate the sealed portions at the opposite two side-peripheral edges of the plastic films 21 and 22. A reference numeral 2d designates the sealed portion at the bottom of the plastic films 21 and 22. These sealed portions 2a–2c are shown in FIG. 1 as hatched area. In an example, each of the sealed portions 2a–2c extends over 10 mm in width, so that the interior defined in the bag 2 has 170 mm in width and 290 mm in length or height.

The filter sheet 5 used in this embodiment is made of nonwoven fabric having 100 mm in width and 300 mm in length. Accordingly, the filter sheet 5 extends over the full length in the bag interior. The interior of the bag 2 is divided by the filter sheet 5 into two sections, a sample receiving section 3 of a larger volume and a suspension collection section 4 of a smaller volume.

The filter sheet 5 is sealed at three portions, in respectively different manners, to one or both of the plastic films 21 and 22. More particularly, the filter sheet 5 is sealed at one longitudinal edge 5a shown as a left-hand edge in FIG. 1 between the plastic films 21 and 22 theretogether. In practice, the plastic films 21 is laid on the top of the other plastic film 22 with the filter sheet 5 being interposed therebetween in such a manner that the side-peripheral edges 2a, 2a of the plastic films 21, 22 and the longitudinal edge 5a of the filter sheet 5 are in exact alignment with each other, and a resulting multi-layered sheet is heat-sealed at the aligned left-hand edge over the entire length of the bag (300 mm) and 10 mm in width so that the longitudinal edge 5a of the filter sheet 5 is integrally sealed to the plastic films 21, 22.

The other longitudinal edge 5b, shown as a right-hand edge in FIG. 1, is heat-sealed over the entire length (300 mm) and 10 mm in width to the inside of the plastic film 22 substantially at a center thereof. The sealed portion is shown in FIG. 1 as a hatched area. As clearly shown in FIG. 2, the sample receiving section 3 is defined between the plastic films 21, 22 and the filter sheet 5, whereas the suspension collection section 4 is defined between the plastic film 22 and the filter sheet 5. Each of the sections 3 and 4 extends over the entire length of the bag 2, except the heat-sealed bottom 2d.

The filter sheet 5 is also heat-sealed to the inside of the plastic film 21 at a portion 5c in close vicinity to the left-hand edge 5a which is integrally heat-sealed to the edges 2a, 2a of the plastic films 21, 22. The heat-sealed portion 5c is shown in FIG. 1 as a hatched area with dotted lines. It is to be noted that the heat-sealed portion 5c extends halfway from the open top edge 2c and does not reach the bottom 2d of the bag 2. In an example, this half-length seam 5c extends over approximately 120 mm from the open top 2c of the bag 2. This should be compared with the opposite longitudinal edges 5a and 5b which are heat-sealed over the entire length of the bag 2.

As described above, the heat-sealed portions or seams 2a (5a), 2b, 2d, 5b and 5c are shown in FIG. 1 as hatched area. In FIG. 2, the filter sheet 5 is shown in contact with the plastic film 21 and/or 22 at some portions, which indicates the seams.

The filter bag 1 is used as follows: First, a food sample and its dilution, which is typically water, are poured into the sample receiving section 3. As shown in FIG. 2, the sample receiving section has a sufficiently large volume, because the filter sheet 5 does not divide the bag interior into two equal sections as in the prior art filter bag. Accordingly, with use of this filter bag 1, a large quantity of the food sample may be treated with a homogenizer at the same time. The filter bag 5 also allows the open top edge 2c of the sample receiving section 3 to be enlarged to provide a wide opening, which facilitates entry of the food sample and the dilution.

After pouring the food sample and the dilution into the section 3, the filter bag 1 is set to a predetermined location within a homogenizer. The homogenizer includes, as known in the art, a mechanism for clamping the open top edge 2c of the filter bag 1 to provide water-tight sealing thereat. While the homogenizer is running, the food sample in the section 3 in the filter bag 1 is stirred and smashed by a pair of reciprocating rollers or paddles. Similar homogenizing treatment may be given to the filter bag 1 with a hand-operated roller or by squeezing with hand. When the food sample in the section 3 has been smashed into a suspension in which micro-particles having diameter smaller than a mesh of the filter sheet 5 are dispersed, the suspension would pass through the filter sheet 5 to enter the section 4. A part of the food sample could not been suspended to a sufficient degree even after being subjected to the homogenizing treatment over a predetermined period of time, which remains in the section 3.

Thus, the section 4 in the filter bag 1 contains the suspension which is ready to be pipetted for microorganism inspection with an electronic microscope. Since the section 4 has a volume much smaller than the section 3, the suspension collected in the section 4 after the homogenizing treatment would usually reach to a sufficiently elevated level, which facilitate the operator to pipet a necessary quantity of the suspension without need to tilt the filter bag 1 or squeeze the bottom of the filter bag 1. The operator simply holds a pipette upright-down and inserts the same into the section 4, from the above, through the open top edge 2c.

For easy insertion of the pipette, it is preferable that the suspension collection section 4 provides a greater opening at the top edge 2c. In the filter bag 1, this is achieved in the following manners.

First, there is the filter sheet 5 between the plastic films 21, 22 within the width of the filter bag 1 in which the suspension collection section 4 is defined. This prevents "blocking" between the plastic films 21, 22. The plastic film 22 will not get stuck to the filter sheet 5 due to material difference therebetween. Accordingly, at least a narrow opening is always and naturally formed at the top edge 2c between the plastic film 22 and the filter sheet 5 which cooperate with each other to define the section 4, as can be seen in FIG. 2. This opening is narrow but usually sufficient for use as a pipette-inserting opening.

When it is desired to provide a greater opening at the top of the section 4, the operator pinches the upper portion of the filter bag 1 from the opposite sides thereof within the width of the suspension collection section 4 and moves the plastic films 21, 22 in opposite directions. Specifically, the plastic film 21 is moved to the right and the plastic film 22 is moved to the left, in FIG. 2. Such operation is easy because these plastic films 21, 22 are separated from each other by the filter sheet 5 interposed therebetween. In this operation, the upper half-length seam 5c has an important function. As the plastic film 22 moves to the left relative to the plastic film 21, the full-length seam 5b is pulled toward the full-length seam 2a (5a) so that the plastic film 22 separates from the filter sheet 5 and tends to be curved outwardly as shown by dotted lines in FIG. 2. On the contrary, an upper left-hand side-peripheral area of the filter sheet 5 between the seams 5a and 5c remains standstill. Accordingly, there is formed a greater opening at the top of the section 4, between the bent portion of the plastic film 22 and the flat portion of the filter sheet 5, as clearly shown by dotted lines in FIG. 2. It is understood that the opening thus formed is a big help in pipetting.

In some case, only a small quantity of the suspension is collected in the section 4 after the homogenizing treatment so that the pipette inserted through the top edge 2c of the filter bag 1 does not reach the level of the suspension. Accordingly, in the preferred embodiment shown in FIGS. 1 and 2, the plastic film 22 has an upper semi-circular pull-tab 7 formed at a position beneath the top edge 2c, between the full-length seam 5b and the half-length seam 5c. In practically preferable application, the pull-tab 7 is formed by piercing the filter bag 1, from one side of the filter bag 1 to the other side throughout the thickness, with a piercing machine having a cutter blade of a semi-circular shape so that all of the plastic films 21, 22 and the filter sheet 5 have semi-circular cutouts 6 at identical positions. The operator may pull down the pull-tab 7 with one hand over a desired length, while holding the upper-left corner of the filter bag 1 with the other hand, thereby providing a pipette-inserting window which extends downward from the cutout 6 to a level above the level of the suspension in the section 4. Thus, the operator inserts the pipette through the pipette-inserting window to pipet a desired quantity of the suspension.

The pull-tab 7 shown in FIG. 1 is semi-circular but of course may be formed in any other shape as far as it is easy to be stripped off in substantially a down-vertical direction. FIGS. 3(A)–3(F) show various examples of the pull-tab 7.

The level of the suspension collected in the section 4 after the homogenizing treatment will in general be proportional to the quantity of the food sample thrown into the section 3. Accordingly, it is preferable that one or plural indexes or pull-down guide lines are printed on the plastic film 22 in correspondence to the food sample quantity. In the embodiment of FIG. 1, there are two indexes 8a, 8b at different levels. For example, the pull-tab 7 should be pulled down to approximately the first index 8a when 250 ml of the food sample is poured into the section 3, whereas it should be pulled down to approximately the second index 8b in the case of 100 ml fold sample.

Although the present invention has been described in connection with a specific embodiment thereof, it should be understood that the present invention has various modifications and variations within a scope of invention that is defined in the appended claims.

Water-tight sealing between the plastic films 21, 22 and/or the filter sheet 5 may be made by using any suitable sealing technique other than heat-sealing. Welding, high-frequency sealing or ultrasonic sealing may be applicable.

What is claimed is:

1. A filter bag comprising:

a. a first plastic film;

b. a second plastic film having substantially the same size as said first plastic film and sealed to said first plastic film at a first side-peripheral edge, a second side-peripheral edge opposite to said first side-peripheral edge and a bottom peripheral edge thereof to provide a bag with an open-top edge;

c. a filter sheet having a length substantially equal to said first and second plastic films and a width smaller than a width of said first plastic film and a width of said second plastic film, said filter sheet having a first longitudinal edge interposed and sealed between said first side-peripheral edge of said first and second plastic films and a second longitudinal edge, opposite to said first longitudinal edge, sealed to an inner wall of said first plastic film at an intermediate position in width of the filter bag, said filter sheet being also sealed to an inner wall of said second plastic film, in vicinity of said first side-peripheral edge, to provide a half-length seam extending from the open-top edge halfway toward the bottom peripheral edge of the filter bag; and d. an interior of said bag being partitioned by said filter sheet into a sample receiving section defined between said first and second plastic films and said filter sheet and a suspension collection section, having a volume smaller than a volume of said sample receiving section, defined between said first plastic film and said filter sheet.

2. A filter bag according to claim 1 wherein said first plastic film includes a pull-tab near the open top edge, between said second longitudinal edge and said half-length seam, said pull-tab being manually pulled down over a given length to provide a pipette-inserting window.

3. A filter bag according to claim 2 wherein said pull-tab has substantially semicircular arc or crescent.

4. A filter bag according to claim 2 wherein said first plastic film has one or plural indexes below said pull-tab at predetermined level from the bottom in relation to a quantity of the food sample to be received in said sample receiving section, said indexes serving guide lines in pull-down of said pull-tab.

* * * * *